United States Patent Office 3,531,278
Patented Sept. 29, 1970

3,531,278
PROCESS FOR PREPARING SODIUM
BORATE COMPOSITIONS
Nelson P. Nies, Laguna Beach, Calif., assignor to United
States Borax & Chemical Corporation, Los Angeles,
Calif., a corporation of Nevada
No Drawing. Filed Mar. 20, 1967, Ser. No. 624,206
Int. Cl. A01n 11/00
U.S. Cl. 71—128                                    11 Claims

ABSTRACT OF THE DISCLOSURE

Noncaking and dust free sodium borate compositions having a mole ratio of $Na_2O/B_2O_3$ of less than 0.5 are prepared in the form of particles containing sodium pentaborate by adding 3 to 12 percent water to a tumbling mixture of particles of either boric acid, boric oxide, metaboric acid or sodium pentaborate with anhydrous borax, borax pentahydrate, borax decahydrate or sodium pentaborate and heating the moist tumbling mixture to a temperature of 70–115° C.

BACKGROUND OF THE INVENTION

Sodium borate compositions are extensively utilized as concentrated solutions applied to wood products as a fire retardant or applied to foliage to kill weeds or defoliate plants and the like. The utilization and stabilization of such concentrated solutions is disclosed in Pats. Nos. 2,643,947 and 2,662,810.

It is much more practical and economical to handle, ship and store sodium borate compositions in dry form readily reconstitutable to a solution of desired concentration. Consumers prefer that the bulk packaged product be substantially dust free and noncaking during storage and should quickly and completely dissolve in water to form a solution of known concentration at the time it is to be utilized.

DESCRIPTION OF THE PRIOR ART

Sodium borate compositions having mole ratios of $Na_2O/B_2O_3$ less than 0.5 can be made by mixing borax or boric acid with crystalline sodium pentaborate or by mixing borax or boric acid with at least one of the compounds in anhydrous form. However, the expense of the previous manufacture in the crystallization of sodium penataborate or the dehydration of borax or boric acid renders these processes undesirable. Furthermore, the mixtures including anhydrous materials dissolve in water slowly.

Untreated mixtures of boric acid and borax pentahydrate severely cake during storage. Drying these products in a double drum dryer reduces caking tendency but again is uneconomical because of the cost of steam and handling and in some cases the product can be flaked only with very slow rotation of the drums. The above compositions which are mechanical mixtures of different compounds are subject to segregation of the components so that homogeneity cannot be assured on withdrawing a set portion for solution in water.

Pat. No. 2,998,310 discloses an homogenous, soluble sodium borate composition, not subject to segregation, prepared by spray drying a water solution of soluble compounds such as boric acid, sodium pentaborate, sodium tetraborate and sodium metaborate mixed in a ratio to yield the desired final $Na_2O/B_2O_3$ ratio. The final product is a very finely divided, partially hydrated sodium borate, typically less than about 200 mesh with an appreciable portion of the particles less than 350 mesh.

The spray drying process requires several steps with associated equipment. The concentrated feed solution must be heated to dissolve the compounds such as in a steam heated tank, the air is preheated and the solution and air are then delivered to a spray drying chamber and the warm solution atomized into the hot air. The warm particles are cooled and separated. The expense of equipment, the energy to heat the air and the feed solution and the time and personnel involved in carrying out the several procedures, as well as the ultrafine product obtained must be balanced against advantages in the noncaking, nonsegregating, quickly dissolving product that is obtained.

BRIEF DESCRIPTION OF THE INVENTION

It has now been discovered that readily soluble, partially hydrated sodium borate compositions having a $Na_2O/B_2O_3$ molar ratio of less than 0.50 and preferably between 0.1 to 0.35 can be readily and conveniently prepared in a homogenous, solid form involving no fine dust in a much simpler and less costly operation. The process involves the use of simple equipment, moderate temperatures and can utilize the least expensive starting materials. The product retains the advantages of the spray-dried product with the additional advantage of the absence of fines. The product has reduced caking tendency, dissolves readily in water, and is in a medium density form very suitable for bulk packaging. The particles, even though they contain appreciable water of hydration, have little tendency to cake and are free-flowing since they do not contain the sharp, fine edge surfaces typically associated with crystalline materials. The component ingredients are intimately dispersed throughout each particle, but yet are stationary within each particle, and thus equal portions of the material will have a uniform composition and will form a solution of level concentration.

The compositions are produced in accordance with the invention by addition of 3 to 12 percent water to an agitated mixture of sodium borate forming materials such as particles of borax and boric oxide or various equivalents for these compounds such as metaboric acid or sodium pentaborate in the desired final $Na_2O/B_2O_3$ ratio and then heating the mixture to 70° C. to 115° C. The borax may be anhydrous or in a pentahydrated or decahydrated form. The boric acid may be in an anhydrous (boric oxide) form or may be added as metaboric acid. Sodium pentaborate may be mixed with any of the above compounds to form compositions having an $Na_2O/B_2O_3$ mole ratio of not more than 0.5.

During agitation of the moist mixture, the finer particles and the surface layer of the larger particles of the borax and boric acid are dissolved, forming sodium pentaborate and agitation is continued with the particles in light rolling contact for a time interval sufficient for this sodium pentaborate phase to become associated with the remaining undissolved granules. The solution of the surface of the larger particles is believed to smooth the sharp edges of these surfaces, a factor which otherwise contributes to caking. The dissolution of the smaller particles obviously eliminates fines.

The intensity and duration of agitation should be controlled especially during drying to avoid reformation of fines by attrition. Generally, the mixing rate is mild and tumbling at below about 60 r.p.m., is sufficient. Less than two hours of mixing generally is satisfactory and advantageously the product can be prepared in less than one hour of mixing.

The manner of adding the water can also influence the size distribution of the product. Stirring the particles during water addition minimizes local agglomeration and addition of the water as a coarse or fine spray rather than locally or instantaneously further avoids balling and lumping of the particles, and adherence of the mixture to the walls of the mixing chamber.

The water and the mixture are preferably at a moderate temperature below 40° C. to avoid formation of a sticky, viscous mass. Addition of ambient temperature water to an unheated mixture results in a slight rise in temperature not requiring external cooling. Amounts of water above about 12 percent may turn the mixture into a viscous mass and amounts below about 3 percent are inadequate to sufficiently eliminate fines and caking tendency. It has been found that optimum results are obtained with control of water between 5 to 10 percent. In the absence of water, no sodium pentaborate is formed and the mixture is more dusty and is apt to cake during storage.

Drying at temperatures below about 70° C. requires excessive drying time, and does not sufficiently avoid caking. At temperatures of about 115° C. or more the particles may soften, and adhere to each other and to the walls of the mixer. Temperatures between 90 and 105° C. have been found to most consistently produce noncaking, dust free sodium borate compositions.

As heat is applied to the moist tumbling mixture, the particles will roll over one another in light contact and the sodium pentaborate phase will associate itself with the surfaces of single or multiple granules. As heating is continued, some of the water will be evaporated and any borax decahydrate which may have formed is eliminated from the product. Heat is discontinued when the granules are sufficiently distinct to remain as stable, noncaking, nonpowdering mixtures of sodium borate.

A more thorough understanding of the invention, its advantages and manner of operation and performance can be had from the following description of a typical preferred manner in which it can be carried out, it being understood that many changes may be made in the specific detail of the described procedure and that equivalent methods and materials may be used without departing from the scope of the invention.

DESCRIPTION OF THE PREFERRED EMBODIMENT

Laboratory scale experiments are conducted by placing a mixture of borax or boric acid granules or the various equivalents in a shell of a laboratory rotary mixer provided with two lifters mounted at a slanting angle. On rotation of the shell at 46 r.p.m., the granules are lifted and mixed with a tumbling action. A predetermined quantity of water is added gradually to the tumbling mixture as a coarse or fine stream from a wash bottle. Tumbling of the mixture is continued at ambient temperature (15° C. to 40° C.) until the water is absorbed, the mixture appearing to be dry.

The mixture is then partially dried by contacting the exterior of the shell with hot air and then with a gas flame until a desired temperature is attained. Mixing is continued until the product is cool. Lumps, if present, are removed with a 12 or 16 mesh screen and can be crushed and added to the product.

In a first series of experiments the effect of water on the presence of fines and the qualitative makeup of the granules is demonstrated. The starting material consists of a mixture of 300 grams of borax 5 mol, technical grade (T.G.) (15% through 100 mesh) and 700 grams of fine mesh (F.M.) boric acid (77% through 100 mesh). The varying amounts of water are added as a fine spray from a water wash bottle. Six experiments are reported in the following table.

TABLE I

| Exp. No. | Water added, g. | Mixing without heat | | Mixing with heat | | Product wt., percent | | Mol ratio, $Na_2O:B_2O_3$ | −100 mesh, percent |
| --- | --- | --- | --- | --- | --- | --- | --- | --- | --- |
| | | Time, min. | Temp., °C. | Time, min. | Temp., °C. | $Na_2O_9$ | $B_2O_3$ | | |
| 1 | 0 | None | | 45 | 93 | 7.09 | 54.3 | 0.147 | 47.6 |
| 2 | 20 | 20 | 26–22 | 23 | 22–95 | 5.99 | 54.97 | 0.123 | 32.5 |
| 3 | 30 | 20 | 25–20 | 34 | 20–95 | 6.15 | 55.22 | 0.125 | 26.7 |
| 4 | 40 | 24 | 26.5–20 | 24 | 20–104 | 5.26 | 55.61 | 0.106 | 27.9 |
| 5 | 51.6 | 20 | 25–18.5 | 40 | 21–110 | 6.63 | 58.81 | 0.127 | 8.7 |
| 6 | 97 | 23 | Room | 20 | 20–70 | 7.91 | 56.10 | 0.159 | 2.1 |

As compared to control Experiment 1, to which no water is added, the amount of fines decreases on increasing water addition and is less than 30% through 100 mesh, a substantial improvement, at 3 percent water addition and is less than 10% through 100 mesh, a significant improvement at above about a 5 percent water addition. The amount of water remaining can be calculated by a difference of the $Na_2O$ and $B_2O_3$ weight percentages from 100 percent, the product generally containing about 30 percent to 40 percent by weight of water. X-ray crystallographic examination of the product of Experiment 1 shows it to contain $H_3BO_3$ and borax 5 mol, whereas the examination of the products of the succeeding experiments, in which water was added, shows that they contain $H_3BO_3$, borax 5 mol and sodium pentaborate.

The effect of varying temperature, water addition and mixing on the properties of the products, and the illustration of alternative starting materials are reported in the following table:

TABLE II

| | Experiment No. | | | | | | |
|---|---|---|---|---|---|---|---|
| | 1 | 2 | 3 | 4 | 4a | 5 | 5a |
| Borax 5 mol: | | | | | | | |
| Type | T.G. | T.G. | T.G. | T.G. | | T.G. | |
| Amount, g | 300 | 300 | 300 | 300 | | 300 | |
| Boric acid: | | | | | | | |
| Type | F.M. | T.G. | T.G. | T.G. | | F.M. | |
| Amount, g | 700 | 700 | 700 | 700 | | 700 | |
| Water: | | | | | | | |
| Amount, g | 0 | 20 | 30 | 40 | | 51.6 | |
| Time of addition, min | 0 | | | | | | |
| Mixing without heat: | | | | | | | |
| Minutes | None | 20 | 20 | 24 | | 20 | |
| Temp., °C | | 26–22 | 25–20 | 26.5–20 | | 25–18.5 | |
| Mixing with heat: | | | | | | | |
| Minutes | 45 | 23 | 34 | 24 | +25 | 31 | +9 |
| Temp., °C | 93 | 22–95 | 20–95 | 20–62 | 62–104 | 20–64 | 64–110 |
| Caking, p.s.i., days | F.F.(1) 140(15) | 0(7) >600(14) | F.F.(7) >600(14) | >600(7) | F.F.(14) | F.F.(5) >600(14) | F.F.(7) F.F.(14) |
| Na₂O, wt. percent | 7.09 | 5.99 | 6.15 | 5.26 | | 5.61 | 6.63 |
| B₂O₃, wt. percent | 54.3 | 54.97 | 55.22 | 55.61 | | 56.01 | 58.81 |
| Mol ratio, Na₂O/B₂O₃ | 0.147 | 0.123 | .125 | .106 | | 0.113 | 0.127 |

| | Experiment No. | | | | | | |
|---|---|---|---|---|---|---|---|
| | 6 | 7 | 8 | 8a | 9 | 10 | 11 |
| Borax 5 mol: | | | | | | | |
| Type | T.G. | T.G. | T.G. | T.G. | T.G. | T.G. | T.G. |
| Amount, g | 300 | 300 | 300 | 300 | 300 | 300 | 300 |
| Boric acid: | | | | | | | |
| Type | F.M. | F.M. | F.M. | F.M. | F.M. | F.M. | F.M. |
| Amount, g | 700 | 700 | 700 | 700 | 700 | 700 | 700 |
| Water: | | | | | | | |
| Amount, g | 60 | 71 | 71 | 70 | 70 | 80 | 100 |
| Time of addition, min | 7 | 3 | 34 | | | | 3.5 |
| Mixing without heat: | | | | | | | |
| Minutes | 35 | 21 | 118 | 17 | 1 | 15 | 20 |
| Temp., °C | 19.7–20.7 | 19.5–21.5 | 21–28 | 26.1–19.5 | 24–19.4 | 22.8–18.4 | 23.2–17.8 |
| Mixing with heat: | | | | | | | |
| Minutes | 38 | 31 | 30 | 25 | 52 | 21 | 33 |
| Temp., °C | 19.7–98 | 21–101 | 28–100 | 21–100 | 24–100 | 22–76 | 21–91 |
| Caking, p.s.i., days | 0–F.F.(17) | 0–F.F.(17) | 68(17) | F.F.(17) | 0–F.F.(14) | F.F.(14) | F.F.(14) |
| Na₂O, wt. percent | | 6.60 | | 6.69 | 7.49 | 6.71 | 6.56 |
| B₂O₃, wt. percent | | 56.67 | | 56.51 | 62.69 | 55.55 | 57.20 |
| Mol ratio, Na₂O/B₂O₃ | | 0.131 | | 0.133 | 0.134 | 0.136 | 0.129 |

| | Experiment No. | | | | | | |
|---|---|---|---|---|---|---|---|
| | 12 | 12a | 13 | 13a | 14 | 14a | 15 |
| Borax 5 mol: | | | | | | | |
| Type | (¹) | | (¹) | | (¹) | | (¹) |
| Amount, g | 300 | | 537.1 | | 537.1 | | 537.1 |
| Boric acid: | | | | | | | |
| Type | F.M. | | F.M. | | F.M. | | F.M. |
| Amount, g | 700 | | 462.9 | | 462.9 | | 462.9 |
| Water: | | | | | | | |
| Amount, g | 100 | | 51.5 | | 70 | | 100 |
| Time of addition, min | | | | | | | |
| Mixing without heat: | | | | | | | |
| Minutes | 30 | | 22 | | 20 | | 19 |
| Temp., °C | 17–21 | | 20–26 | | 20–28 | | 20–30 |
| Mixing with heat: | | | | | | | |
| Minutes | 14 | +15 | 23 | +21 | 37 | +25 | 40 |
| Temp., °C | 21–91 | 91–103 | 28–92 | 92–100 | 28–91 | 91–100 | 28–94 |
| Caking, p.s.i., days | F.F.(14) | F.F.(25) | F.F.(15) | 0(25) | F.F.(15) | 0(25) | F.F.(14) |
| Na₂O, wt. percent | 6.68 | | 12.00 | 12.45 | 12.28 | 12.72 | 12.49 |
| B₂O₃, wt. percent | 57.85 | | 54.67 | 55.39 | 56.03 | 56.82 | 55.15 |
| Mol ratio, Na₂O/B₂O₃ | 0.130 | | 0.247 | 0.253 | 0.246 | 0.252 | 0.255 |

| | Experiment No. | | | | | | |
|---|---|---|---|---|---|---|---|
| | 16 | 17 | 18 | 19 | 20 | 21 | 22 |
| Borax 5 mol: | | | | | | | |
| Type | (²) | (²) | (¹) | T.G. | T.G. | T.G. | T.G. |
| Amount, g | 702.5 | 702.5 | 657 | 300 | 300 | 400 | 698 |
| Boric acid: | | | | | | | |
| Type | T.G. | T.G. | (³) | T.G. | T.G. | T.G. | T.G. |
| Amount, g | 797.4 | 797.4 | 343 | 700 | 700 | 600 | 302 |
| Water: | | | | | | | |
| Amount, g | 0 | 50 | 74 | 70 | 117.9 | 50.5 | 45 |
| Time of addition, min | | | | | | | |
| Mixing without heat: | | | | | | | |
| Minutes | 1 | 31 | 32 | 80 | ⁴15 | 18 | 57 |
| Temp., °C | | 23–28 | 22–59 | 20–25 | Room | 25–28 | Room |
| Mixing with heat: | | | | | | | |
| Minutes | | 11 | 10 | 15 | 20 | 17 | 13 |
| Temp., °C | | 28–90 | 32–90 | 20–113 | 20–102 | 28–90 | 20–112 |
| Caking, p.s.i., days | 60(14) | 0(14) | F.F. | F.F.(47) | F.F.(27) | F.F.(17) | F.F.(24) |
| Na₂O, wt. percent | 13.37 | 13.65 | 12.24 | 7.06 | 7.29 | 13.76 | 15.81 |
| B₂O₃, wt. percent | 60.14 | 59.34 | 57.40 | 57.75 | 57.69 | 54.77 | 53.88 |
| Mol ratio, Na₂O/B₂O₃ | 0.250 | 0.258 | 0.240 | 0.137 | 0.142 | 0.282 | 0.330 |

¹ Type B.
² AB dust was used instead of Borax 5 mol.
³ ABA dust was used instead of boric acid.
⁴ 41 r.p.m.

The boric acid materials utilized in the experiments are granules of the fine mesh (F.M.) boric acid previously discussed, anhydrous boric acid granules (ABA) such as boric oxide and a technical granular (T.G.) grade of boric acid (40% through 100 mesh). The borax starting materials varied from the technical granular (T.G.) grade discussed above, a Type B grade (about 9% through 100 mesh) of borax 5 mol, and anhydrous borax (AB) dust. The AB analysis is 28.63% $Na_2O$ and 64.76% $B_2O_3$ and the ABA product contains 92.8% $B_2O_3$ with less than 0.1% $Na_2O$. In some of the experiments the mixer is covered during a portion of the heating step.

Caking tests are run by placing 140 ml. of the dry product in a standard spring-loaded sealed caking jar at approximately 4 p.s.i. The jar is placed in a cabinet which is cycled on a schedule of 12 hours at 75° F. and 12 hours at 115° F. for several days to two weeks. If not freeflowing (FF), the material was tested with a penetrometer with a ¼″ head and the readings were multiplied by 4. A zero reading indicates the material is not free-flowing but is penetrated by the penetrometer head with a pressure so slight as not to record a reading. A product showing a p.s.i. value of about 150 or less has satisfactory flow or caking properties.

Though 2–3% water addition significantly affects fines control (Table I) this amount of water produces a product that unsatisfactorily cakes (>600 p.s.i.) after 14 days. Products to which more than 3% by weight of water but less than 12% by weight of water are added show quite satisfactory caking properties. Caking tendency, compared to the control experiment, at first decreases on the addition of water and then improves above 3% addition. In experiments in which the water is added instantaneously from a graduate or in which the dry mixture is heated to above 40° C. before water addition the mixture became a viscous, balled, unworkable mass.

Drying at temperatures below 70° C. gives unsatisfactory caking tendency which decreases at higher temperature. Consistently better results are apparent at temperatures from 90° C. to 105° C. It is necessary to add water at or near room temperature and to dry the product at a high temperature. It can also be seen from a comparison of Experiments 7 and 8 of Table II that substantially increased agitation time causes a more caked product. The mixing interval without heat is usually around 20 minutes but can be as little as one minute (Exp. 4) or as much as 80 minutes (Exp. 20) without apparent effect on the caking results.

The mixing time with heat need not be unduly long. In Experiment 20 in which 11.79% water is added, the moist mixture is only agitated with heat for 20 minutes.

A final experiment was conducted to explore the addition of the moist mixture to a preheated dryer with a view toward operation of the process in continuous production scale equipment.

Seventy-nine (79) grams of water was added in a fine stream to 300 g. T. G. Borax 5 Mol and 700 g. T. G. boric acid in a mixer rotating at 41 r.p.m. and the moist mixture mixed twenty minutes without heat. The mixture was removed from the mixer and the mixer was heated. The mixture was replaced and rapidly heated in five minutes to 100° C. and a non-caking, non-powdery product without undue lumping having the following screen analysis was obtained:

TABLE III

| | Percent | $Na_2O$, wt. percent | $B_2O_3$, wt. percent | $Na_2O/B_2O_3$, molar ratio |
|---|---|---|---|---|
| U.S. screen: | | | | |
| +12 | 4.8 | 4.72 | 55.18 | 0.096 |
| −12+40 | 65.7 | 7.01 | 56.71 | 0.139 |
| −40+45 | 12.6 | 6.44 | 56.71 | 0.128 |
| −45+140 | 16.9 | 6.78 | 57.70 | 0.132 |
| −140 | .02 | | | |

Nearly the same ratio product was found in the various sized particles except for the small percentage of lumps which were high in boric acid. This experiment demonstrates the feasibility of the hot drier technique, a procedure utilized in large scale production.

It should be understood that the foregoing disclosure relates only to preferred embodiments of the invention, and that numerous modifications or alterations are possible without departing from the spirit and scope of the invention as set forth in the following claims.

What is claimed is:

1. A method of preparing a sodium borate product having an $Na_2O/B_2O_3$ molar ratio of from about 0.1 to 0.5 comprising the steps of:
   adding 3 to 12 percent by weight of water to a homogenous mixture of particles of anhydrous borax, borax pentahydrate, borax decahydrate or sodium pentaborate and particles of boric acid, boric oxide, metaboric acid or sodium pentaborate in sufficient amount to form sodium borate of said molar ratio while agitating the particles;
   heating the moist mixture with agitation at a temperature of from about 70° C. to 115° C.; and
   recovering a sodium borate composition of particles including sodium pentaborate having reduced fine content and caking tendency.

2. A method of forming a sodium borate composition having a mole ratio of $Na_2O/B_2O_3$ of between about 0.1 and 0.35 comprising the steps of gradually adding 5 to 10% by weight of water to an agitated mixture of granules including a member selected from the group consisting of anhydrous borax, borax pentahydrate, borax decahydrate or sodium pentaborate with a member selected from the group consisting of boric acid, boric oxide, metaboric acid or sodium pentaborate, and heating the agitated mixture to a temperature of about 90° C. to 105° C.

3. A method of preparing a free flowing sodium borate product having a molar ratio of $Na_2O/B_2O_3$ of 0.1 to 0.35, comprising the steps of:
   mixing in the desired final ratio particles of borax pentahydrate with particles of boric acid;
   moistening said agitated particles with 5–10 percent by weight of water; and
   heating the moistened mixture with agitation to a temperature of from 90° C. to 105° C.

4. A method according to claim 3 wherein the mixtue is agitated in a rotary mixer revolving at less than 60 r.p.m.

5. A method according to claim 3, in which the final product contains less than 30%–100 mesh particles and from 30 percent to 40 percent by weight of water.

6. A method according to claim 5 in which the product contains less than 10%–100 mesh particles.

7. A method according to claim 5, in which the water is gradually added to the mixture of particles.

8. A method according to claim 5, in which 5 percent by weight of water is sprayed onto the agitated particles.

9. A process according to claim 8, in which the water is added at a temperature of from 15° C. to 40° C.

10. A process according to claim 3, in which the moist mixture is added to a mixer preheated to a temperature of from 70° C. to 115° C.

11. A process according to claim 3 in which the product is classified and the +12 mesh particles are separated, crushed and returned to the product.

References Cited

UNITED STATES PATENTS

| 2,643,947 | 6/1953 | Connell. | |
| 2,662,810 | 12/1953 | Taylor et al. | |
| 2,998,310 | 8/1961 | O'Brien et al. | |
| 1,961,073 | 5/1934 | Newman | 23—59 |
| 2,567,909 | 9/1951 | Linde | 260—623 |

(Other references on following page)

References Cited

| | | | |
|---|---|---|---|
| 2,690,387 | 9/1954 | O'Brien et al. | 71—128 |
| 2,773,738 | 12/1956 | Ball et al. | 23—59 |
| 2,792,295 | 5/1957 | Wright | 71—109 |
| 2,886,425 | 5/1959 | Seibert | 23—59 |
| 3,056,723 | 10/1962 | Galloway | 167—42 |
| 3,010,786 | 11/1961 | Taylor et al. | 23—59 |
| 3,109,705 | 11/1963 | Schmitt | 23—59 |
| 3,143,407 | 8/1964 | Mitchell et al. | 71—80 |
| 3,149,953 | 9/1964 | Miller | 71—93 |
| 3,274,052 | 9/1966 | Yaffe et al. | 167—42 |

LEWIS GOTTS, Primary Examiner

G. HOLLRAH, Assistant Examiner

U.S. Cl. X.R.

11—69; 252—1, 2

PO-1050
(5/69)

UNITED STATES PATENT OFFICE
CERTIFICATE OF CORRECTION

Patent No. __3,531,278__      Dated __September 29, 1970__

Inventor(s) __Nelson P. Nies__

It is certified that error appears in the above-identified patent and that said Letters Patent are hereby corrected as shown below:

Column 3, line 12, after "r.p.m." delete ",";
Column 6, Table II, Experiment No. 21, in the line referring to Caking, psi, "F.F.(17)" should be --F.F.(16)--;
Column 8, line 55, "5" should be --3--.

SIGNED AND
SEALED
JAN 5 1971

(SEAL)
Attest:

Edward M. Fletcher, Jr.
Attesting Officer

WILLIAM E. SCHUYLER, JR.
Commissioner of Patents